SQUITTER MONITOR MODULE

Filed Dec. 2, 1963 3 Sheets-Sheet 1

SQUITTER MONITOR MODULE

Filed Dec. 2, 1963

FLIP-FLOP POSITION

| ACTUAL COUNT | 41 | 42 | 43 | 44 | 45 | 46 | 47 | 48 | 49 | 50 | 51 | 52 | SIGN | FLIP-FLOP |
|---|---|---|---|---|---|---|---|---|---|---|---|---|---|---|
| | 0 | 1 | 2 | 3 | 4 | 5 | 6 | 7 | 8 | 9 | 10 | 11 | SIGN | POWER OF 2 |
| | 1 | 2 | 4 | 8 | 16 | 32 | 64 | 128 | 256 | 512 | 1024 | 2048 | SIGN | VALUE |
| RESET | 0 | 0 | 1 | 0 | 1 | 1 | 1 | 1 | 1 | 1 | 1 | 1 | 0 | |
| 11 | 1 | 1 | 1 | 1 | 1 | 1 | 1 | 1 | 1 | 1 | 1 | 1 | 0 | |
| 12 | 0 | 0 | 0 | 0 | 0 | 0 | 0 | 0 | 0 | 0 | 0 | 0 | 1 | |
| ↓ | | | | | | | | | | | | | | |
| 2603 | 1 | 1 | 1 | 1 | 1 | 0 | 0 | 0 | 0 | 1 | 0 | 1 | 1 | |
| 2604 | 0 | 0 | 0 | 0 | 0 | 1 | 0 | 0 | 0 | 1 | 0 | 1 | 1 | ACCEPT REGION |
| 2635 | 1 | 1 | 1 | 1 | 1 | 1 | 0 | 0 | 0 | 1 | 0 | 1 | 1 | |
| 2636 | 0 | 0 | 0 | 0 | 0 | 0 | 1 | 0 | 0 | 1 | 0 | 1 | 1 | |
| 2699 | 1 | 1 | 1 | 1 | 1 | 1 | 1 | 0 | 0 | 1 | 0 | 1 | 1 | |
| 2700 | 0 | 0 | 0 | 0 | 0 | 0 | 0 | 1 | 0 | 1 | 0 | 1 | 1 | |
| 2763 | 1 | 1 | 1 | 1 | 1 | 1 | 0 | 1 | 0 | 1 | 0 | 1 | 1 | |
| 2764 | 0 | 0 | 0 | 0 | 0 | 0 | 1 | 1 | 0 | 1 | 0 | 1 | 1 | |
| 2795 | 1 | 1 | 1 | 1 | 1 | 0 | 1 | 1 | 0 | 1 | 0 | 1 | 1 | |
| 2796 | 0 | 0 | 0 | 0 | 0 | 1 | 1 | 1 | 0 | 1 | 0 | 1 | 1 | |

TABLE OF SQUITTER COUNTER CONTENTS

United States Patent Office 3,287,719

Patented Nov. 22, 1966

3,287,719

SQUITTER MONITOR MODULE

Dean S. Thornberg and Richard M. Jepperson, both of Salt Lake City, Utah, assignors to Montek Division of Model Engineering and Manufacturing Corporation, Salt Lake City, Utah, a corporation of Indiana Filed Dec. 2, 1963, Ser. No. 327,386
5 Claims. (Cl. 340—248)

The present invention relates to circuit apparatus for checking and monitoring the rate that pulses are transferred from one circuit to another, as well as effectively guaranteeing that the range of the pulse rate falls within a predetermined or required set of tolerances. More particularly, the invention relates to an improved circuit apparatus used in navigation equipment and omni-directional radio beacon systems to check the rate of pulses received from the beacon or other navigation equipment, and indicating that the rate of pulses received by the monitor circuit of the invention is within certain and ascertainable tolerances. The techniques used in the present invention are completely and throughout digital in character, and transistor circuit components and printed circuit boards are used where feasible.

An advantage of the squitter or pulse rate monitor is that the present invention provides a system that is extremely rugged, adaptable to being embodied on and within printed circuitry in modular form, and may comprise a system of substantial reliability with a minimum amount of necessary adjustments.

In the beacon system in which the squitter monitor circuit is used in the present invention, the reply pulses from the beacon are coupled through a directional coupler and are brought to the input of a squitter rate monitor which determines the order of magnitude of tolerances by which the pulse rate is checked. Where the rate of pulses falls beyond the desired or required tolerances, an alarm device is actuated for indicating that the squitter pulse rate is not within the required tolerances.

These as well as further advantages which are inherent in the invention will become apparent from the following description, reference being had to the accompanying drawings wherein:

FIGURE 1 is a block diagram of a squitter monitor having a portion thereof shown schematically, which includes a circuit for decoding video pairs of pulses during the presence of certain gate signals for producing a digital signal which is applied to a count down chain for providing to a converter a signal for indicating the squitter rate of the pulses as they are received and also developing an alarm inhibit signal when the count down chain has received the correct count within a given tolerance, in accordance with the present invention;

FIGURE 1*a* is a set of time charts for pulses developed in connection with the squitter monitor of FIGURE 1;

Figures 1, 1A:
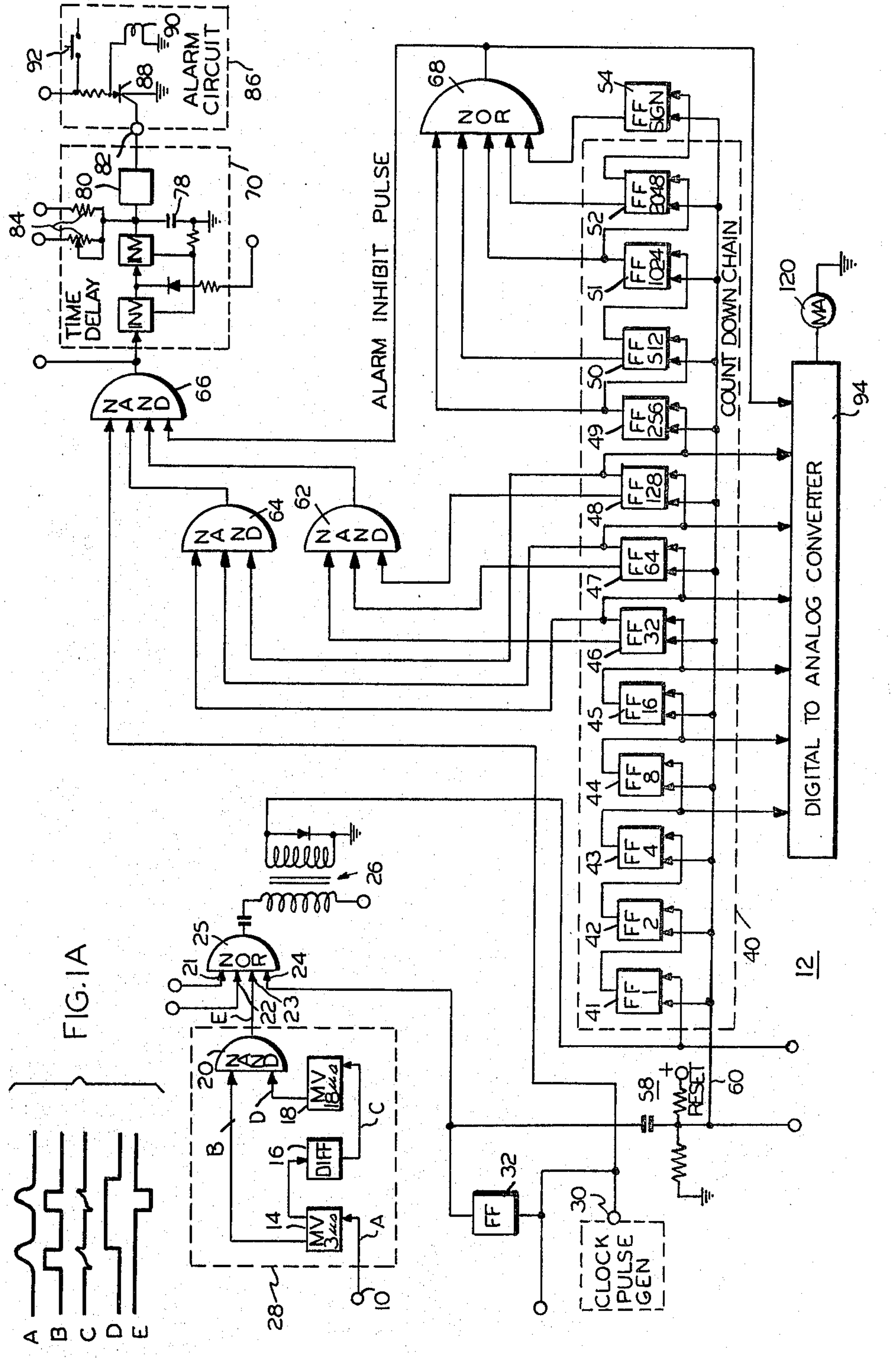

Referring now to the drawings, all of the beacon reply pulses from a directional coupler (not shown) are in pair of Gaussian shaped pulses as shown in waveform A of FIGURE 1*a*, and are applied to an input terminal 10 of a squitter rate monitor 12, and the beacon reply pulses trigger a three-microsecond delay monostable multivibrator 14. The waveform thus applied to the monostable multivibrator 14 is shown in waveform A. The multivibrator 14 produces a negative-going output pulse which is applied to a differentiating circuit 16 and produces a waveform C as shown in FIGURE 1*a*. The positive trailing edge spike of waveform C is set to trigger an 18-microsecond delay monostable multivibrator 18 which produces an output waveform D shown in FIGURE 1*a*. The output waveform of multivibrator 18 is used to condition a NAND gate 20. These components produce a waveform E from a given waveform A, and the cooperation of these components may be identified as a pulse pair decoder 28.

The three-microsecond delay multivibrator 14 also produces a positive-going output waveform B shown in FIGURE 1*a*, which is directly applied to the input of the NAND gate 20, and the second pulse of each pulse pair shown in waveform A, which occurs during the time the NAND gate is conditioned, is passed by the NAND gate to provide the output decoded video waveform E shown in FIGURE 1*a*. The output pulses from the NAND gate 20 are fed to an input terminal 23 of a NOR gate 25. The NOR gate is blocked during the reference bursts by respective gating pulses from a NORTH or reference burst pulse count monitor (not shown) and an auxiliary burst pulse count monitor (also not shown) for providing a NORTH or reference gate pulse and an auxiliary gate pulse applied respectively to terminals 21 and 22 of the NOR gate 25. The NOR gate 25 is enabled only during the alternate pulses produced from a clock pulse generator (not shown) which produces a one pulse per second signal applied to the terminal 30 so that the one pulse per second signals are applied to a control flip-flop 32. The control flip-flop 32 in turn provides the alternate pulse applied to its input to the input terminal 24 of the NOR gate 25. Pulses which pass the NOR gate 25 are coupled through a pulse transformer 26 so that negative-going spikes or pulses, herein called squitter pulses, are applied to a first stage of a count down chain 40 which stages are identified as flip-flops 41–52. The number of squitter pulses are of the order of magnitude of 2700 plus or minus 96 pulses per second. This number of spikes or pulses are squitter or reply pulse pairs shown in waveform A of FIG. 1*a*, since all reference pulses are gated out of the pulse pair decoder 28 comprising the monostable multivibrators 14, 18 and NAND gate 20.

The 12 stage flip-flop count down chain 40 is connected for checking and counting the number of pulses in a one second period determined by the NOR gate 25. The flip-flop count down chain 40 counts in the well-known binary form and together with a SIGN flip-flop 54 comprises a register. As will be described below, there are six flip-flops that are used to give a range of tolerance in the squitter monitor circuit of FIGURE 1.

The flip-flop count down chain 40 and the SIGN flip-flop 54 are reset to an initial value by the output pulse of control flip-flop 32 which passes a reset network 58. The reset pulse is applied over conductor 60 to each of the flip-flops of the count down chain 40 and to the SIGN flip-flop 54. The clock pulse or one cycle per second pulse applied to terminal 30 supplies the pulse to the control flip-flop 32 for resetting the count down chain and the SIGN flip-flop, as described above. The squitter pulses applied to the first stage of the count down chain 40 are gated OFF for one second and are then gated ON for one second by the control flip-flop 32 which receives the one cycle per second pulse from terminal 30. The negative fall or trailing edge of the control flip-flop 32 resets the count down chain 40 and the SIGN flip-flop, which comprise the register described above, to a value of minus 11. When adding the values of the flip-flop states together, there is obtained the total count of the register. If the right-hand side of each flip-flop is taken as the 1 or positive side, the flip-flop is said to contain a 1, and if a flip-flop thus contains a 1, then its value is added to the value of the other flip-flops containing a 1. If a flip-flop contains a zero, that is, where the left-hand side of the flip-flop is positive, its value is not taken and is otherwise ignored.

When a register has been preset to a given value, then the effect of this setting must be taken in consideration with the total count to arrive at a final value. Where the register has been preset to minus 11, it thus takes 11 pulses to reach a state referred to as NEGATIVE ZERO, as shown by line 11 of the table of FIG. 4. This state of NEGATIVE ZERO is when all flip-flops contain a 1 except the SIGN flip-flop 54. The next pulse received by the flip-flop 42 changes all flip-flops to zero except the SIGN flip-flop which is thus changed to 1. Input pulses received by flip-flop 42 continue to advance the count of the count down chain 40. The table of FIGURE 4 describes the logic operation of the count down chain and the SIGN flip-flop 54 comprising the register described above. Thus, when the actual count is 2603, the flip-flops are in the state shown in line 2603 of the table of FIGURE 4. This is obtained by adding the value of the flip-flops containing 1's (2048+512+16+8+4+2+1+12 from preset=2603)

Figures 3, 4:
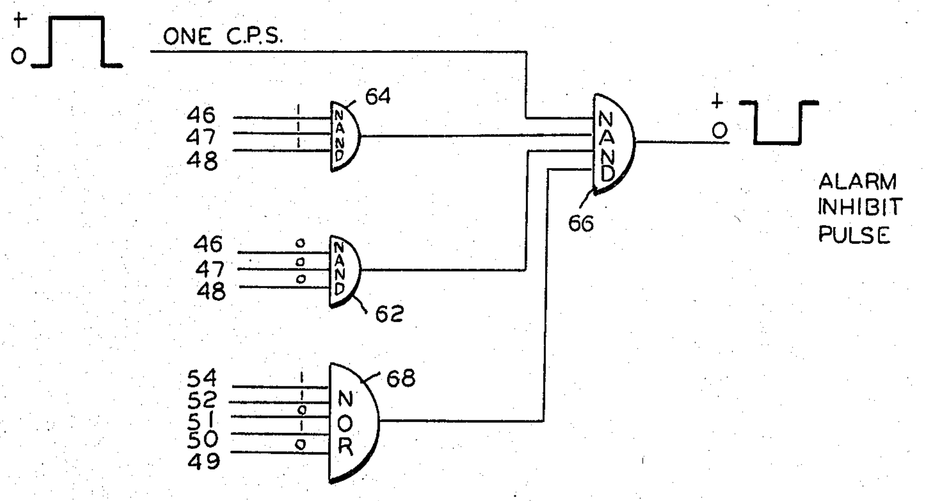
FIGURE 3 is a schematic representation of certain NAND and NOR gates of FIGURE 1 comprising a portion of the invention shown therein.
FIGURE 4 is a table of squitter counter contents.

As is further shown in FIGURE 1, as well as in FIGURE 3, a NAND gate 62 is conditioned by the positive inputs indicative of a zero count of the left side of flip-flops 46, 47 and 48, while a NAND gate 64 is conditioned by positive inputs indicative of a 1 count of the right side of flip-flops 46, 47 and 48. In other words, it is seen that NAND gates 62, 64 are conditioned when all inputs are positive, and this is true when the left-hand side of flip-flops 46, 47 and 48 are zero's. Since a NAND gate inverts the signal when it is conditioned, the output of NAND gates 62, 64 is zero when they are conditioned, and the output is positive for any other combination. Referring now again to the table above, at a count of 2603 the output of NAND gates 62 and 64 is zero. This results in the outputs of NAND gates 62 and 64 not conditioning the NAND gate 66; and when the count reaches 2604, the output of NAND gates 62, 64 goes positive since the condition of flip-flop 46 is changed from the condition of flip-flops 47, 48. The NAND gate 64 has a zero output only when the flip-flops 46, 47 and 48 contain 1. For all other values, the output is positive, so that at the count of 2604 the output of NAND gates 62, 64 is positive.

A NOR gate 68 is conditioned to receive inputs from the 1 state of flip-flops 49, 51, and from the zero state of flip-flops 50, 52 and of SIGN flip-flop 54. The NOR gate 68 provides a positive output only if all inputs are zero. The NOR gate 68 thus provides a positive output between a count of 2572 2048+512+12 from preset=2572 to a count of 2828 (2048+512+256+12 from preset=2828). It is thus readily apparent that NAND gates 62 and 64 have positive outputs several times while the register is counting to 2700, but the NOR gate 68 provides an output only positive between a count on the register of 2572 and 2828.

The NAND gate 66 is conditioned when all inputs are positive, which is possible only between a count of 2604 and 2795. If the positive output pulse from the one cycle per second pulse applied to terminal 30 is present while the count in the register is between these values, the final requirement to condition the NAND gate 66 is accepted and the output acceptance pulse is generated from NAND gate 66 and is applied to a time or alarm delay circuit 70, as shown in FIGURE 1. As has been described above and shown in the table in FIGURE 4, the squitter count is acceptable between a value of count between 2604 and 2795, or 2700 plus or minus 95, which is an accurate value within one count and is completely unambiguous. The actual count of squitter pulses is checked over a one second period to result in no error or ambiguity in the calculation of random action of the squitter pulses.

On the proper and complete conditioning of all the inputs to the NAND gate 66, it then generates an output acceptance pulse or alarm inhibit pulse. The alarm inhibit pulse is applied to the time or alarm delay circuit 70.

Each time the alarm inhibit pulse is received by the time delay circuit 70, any charge on a timing capacitor 78 is immediately bled off and the time delay circuit begins again to recharge. The alarm inhibit pulses may occur sufficiently frequently to prevent the capacitor 78 from completing its full charge which would trigger a unijunction or double-base transistor 80 circuit to produce an alarm pulse at terminal 82. The time value of the capacitor 78 taken together with resistances 84 providing adjustment to the circuit, is 0.5 to 6 seconds. Thus the continued presence of the alarm inhibit pulses maintains the timing capacitor substantially discharged, and the alarm 86 connected to terminal 82 is not actuated. When alarm inhibit pulses are not received to cause the charge of the capacitor 78 to be discharged, the capacitor will continue its charging through the resistances 84. If then no proper alarm inhibit pulse is received within the time period set by the resistances, which is stated to be between 0.5 and 6 seconds, the capacitor will have charged to the firing point of the unijunction transistor 80 and an alarm pulse is sent to the alarm 86. The alarm includes a circuit having a silicon controlled rectifier 88 which is triggered by the alarm pulse for causing the voltage across a lamp 90 to be shorted to ground, since the silicon controlled rectifier 88 is connected in parallel to the lamp, and the lamp will be extinguished. This extinguished condition of the lamp indicates a fault, and the indication continues until the voltage to the silicon controlled rectifier 88 is removed from the silicon controlled rectifier by an alarm reset switch 92 which is depressed to restore the nonalarm condition of the lamp.

Figure 2:
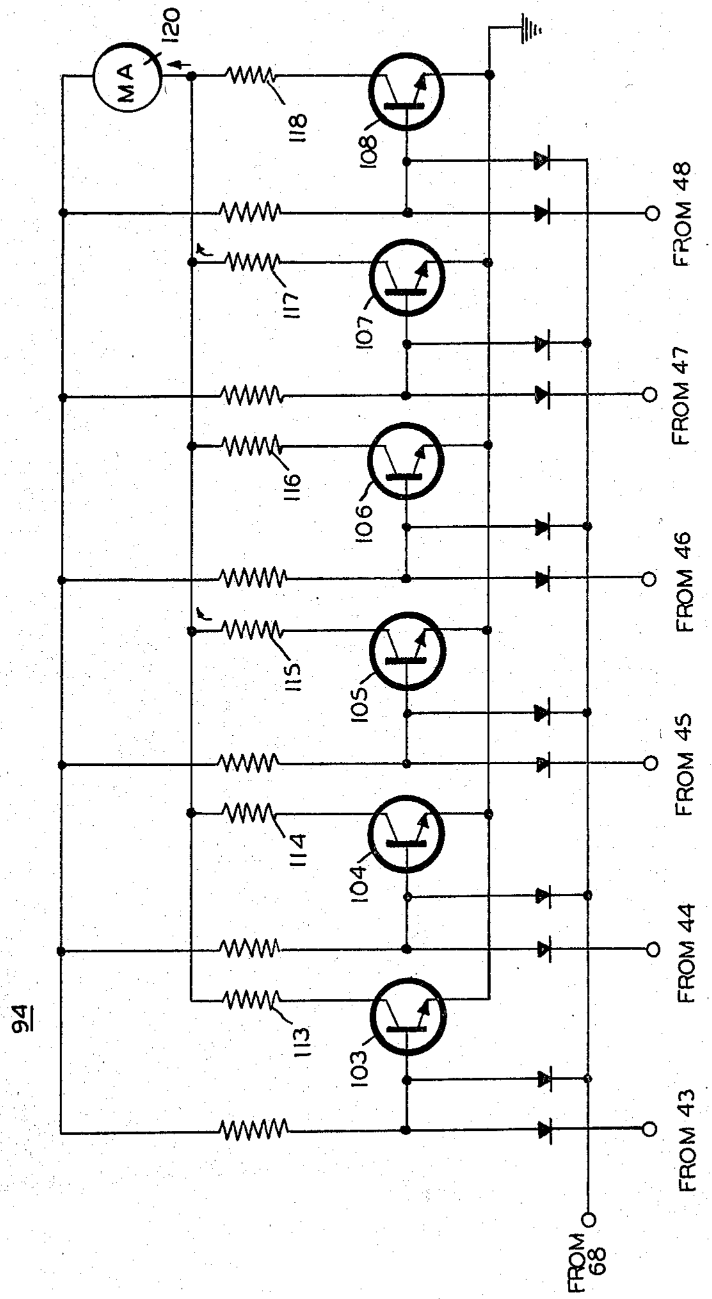
FIGURE 2 is a schematic circuit diagram of the digital-to-analog converter of FIGURE 1.

In the case where it is desirable to have an analog indication of the squitter count in the register, a meter drive digital-to-analog converter (DAC) 94 is connected to the count down chain 40, as shown in FIGURE 2.

The converter 94 is connected to the respective outputs of flip-flops 43–48. The converter is also provided with an output from the output of the NOR gate 68 to prevent ambiguous operation and reading by the converter. The NOR gate output effectively turns the converter ON between a count of 2572 and 2828. After the NOR gate 68 conditions the converter, each transistor, 103, 104, 105, 106, 107, 108, is gated ON by its input connection to a corresponding input derived from flip-flops 43–48, respectively, when a 1 is present in the respective flip-flop. Thus, for example, transistor 103 turns ON when the flip-flop 43 contains a 1. Resistor 113 is selected in value, as are resistors 114–118, so that the current when the transistor is saturated is $\frac{4}{128}$ of the current flowing in resistor 118 when it is turned ON, so that each transistor 103–108 will conduct an amount of current relative to the count of the respective flip-flop which it purports to indicate in the count down chain. As current flows through one or more of the resistors 113–118, the cumulative currents flow through a milliammeter 120.

The meter may be selected so as to give a full scale reading at 2 ma., and if only resistor 118 were in circuit with the meter, the meter should read midscale. Since the threshold or value at which the meter begins to read is 2572, then the midscale value is 2700 (2572+128). It may readily be observed that the meter would read the exact count for any value between 2572 and 2828.

The control flip-flop 32 gates the squitter pulses ON the register for one second. The count down chain 40 is reset when any of the flip-flops 41–52 transfer to a counting state. The meter indication operation is that it counts for one second, holds the reading for one second, then resets to zero and then repeats the above cycle of counting, holding, and resetting.

The circuit of the monitoring system shown in the drawings and described above is seen to guarantee that the squitter pulse rate will fall within a predetermined range of tolerance, or that if the rate is without the given range, an alarm will be actuated to indicate that the range is exceeded. The monitoring system has been found to be an effective monitor of navigation and radio beacon equipment.

It should be understood that the specific apparatus herein illustrated and described is intended to be representative only, as many changes may be made therein without departing from the clear teachings of the invention. Accordingly, reference should be made to the following claims in determining the full scope of the invention.

What is claimed is:

1. A pulse rate monitor system comprising a pulse pair decoder including a first monostable multivibrator receiving beacon reply pulses from a directional coupler, a differentiating circuit having an input from said first monostable multivibrator, a second monostable multivibrator having an input from said differentiating circuit, and a first NAND gate having an input from said first and second monostable multivibrators and having an output terminal for providing decoded video signals; a control and reset flip-flop for receiving signals from a clock pulse generator, a first NOR gate coupled for receiving signals from said first NAND gate and from said control and reset flip-flop, a binary count down chain having a plurality of flip-flop stages each reset by said control and reset flip-flop, the first flip-flop in said count down chain receiving an input from said first NOR gate, a SIGN flip-flop comprising a register with said count down chain, a second NOR gate having inputs from the last four flip-flops in the said count down chain and from said SIGN flip-flop, a digital-to-analog converter having inputs from said second NOR gate and from a plurality of flip-flops which are intermediate stages of said count down chain, a squitter count indicating meter fed by said digital-to-analog converter, a second and a third NAND gate each having inputs from flip-flops which are intermediate to said intermediate stages of the count down chain, a fourth NAND gate having inputs from said second and third NAND gates, from said second NOR gate, and from said pulse generator, a time delay circuit having an input from said fourth NAND gate, and an alarm circuit fed by said squitter rate device, said alarm circuit comprising a silicon controlled rectifier being triggered by said fourth NAND gate, an alarm relay fed by said silicon controlled rectifier, and an alarm lamp controlled by said alarm relay.

2. A pulse rate monitor system comprising a pulse pair decoder including a first monostable multivibrator receiving beacon reply pulses from a directional coupler, a differentiating circuit having an input from said first monostable multivibrator, a second monostable multivibrator having an input from said differentiating circuit, and a first NAND gate having an input from said first and second monostable multivibrators, and said decoder providing from the NAND gate an output providing decoded video signals; a control flip-flop for receiving signals from a pulse generator; a first NOR gate for receiving signals from said first NAND gate and from said control flip-flop and further being conditioned by a NORTH burst pulse and an auxiliary burst pulse; a binary count down chain having 12 flip-flops each being reset by said control flip-flop, the first flip-flop in said count down chain receiving an input from said first NOR gate; a SIGN flip-flop for the count down chain; a second NOR gate having inputs from the last four flip-flops in the said count down chain and from said SIGN flip-flop; a digital-to-analog converter having inputs from the middle six flip-flops of said count down chain and from said second NOR gate, a squitter count indicating meter fed by said digital-to-analog converter; a second and a third NAND gate each having inputs from the sixth, seventh and eighth flip-flops in said count down chain, a fourth NAND gate having inputs from said second and third NAND gates, from said second NOR gate, and from said pulse generator; a time delay circuit having an input from said fourth NAND gate, fed by said time delay circuit; and an alarm circuit triggered by said time delay circuit, said alarm circuit comprising a silicon controlled rectifier and a lamp in parallel arrangement.

3. A pulse rate monitor system comprising a pulse pair decoder including a first monostable multivibrator receiving beacon reply pulses from a directional coupler, a differentiating circuit having an input from said first monostable multivibrator, a second monostable multivibrator having an input from said differentiating circuit, a first NAND gate having an input from said first and second monostable multivibrators, and having an output providing decoded video signals, a control and reset flip-flop receiving signals from a pulse generator, a first NOR gate receiving signals from said first NAND gate and from said control and reset flip-flop and further for receiving a NORTH burst pulse and an auxiliary burst pulse, a binary count down chain having 12 flip-flops each reset by said control and reset flip-flop, the first flip-flop in said count down chain receiving an input from said first NOR gate, a SIGN flip-flop, a second NOR gate having inputs from the last four flip-flops in the said count down chain and from said SIGN flip-flop, a pair of NAND gates having inputs from the flip-flops which are intermediate stages of the count down chain, a fourth NAND gate having inputs from said second and third gates, from said second NOR gate, and from said clock pulse generator, a time delay circuit having an input from said fourth NAND gate, and an alarm circuit triggered by said time delay circuit, said alarm circuit comprising a silicon controlled rectifier connected in parallel with a lamp indicating a state of alarm when the silicon controlled rectifier has been triggered.

4. In a squitter pulse rate monitor system, a digital-to-analog converter having inputs from a plurality of flip-flops which are intermediate stages of a count down chain, a squitter count indicating meter fed by said digital-to-analog converter, a pair of NAND gates each having inputs from the flip-flops which are intermediate to said intermediate stages of the count down chain, a further NAND gate having inputs from said pair of NAND gates and from a clock pulse generator, a time delay circuit having an input from said further NAND gate, a squitter rate device fed by said time delay circuit, and an alarm circuit triggered by said time delay circuit, said alarm circuit comprising a silicon controlled rectifier connected in parallel with a lamp indicating a state of alarm when the silicon controlled rectifier has been triggered.

5. In a pulse rate monitor system comprising a first monostable multivibrator receiving beacon reply pulses from a directional coupler, a differentiating circuit having an input from said first monostable multivibrator, a second monostable multivibrator having an input from said differentiating circuit, a first NAND gate having an input from said first and second monostable multivibrators, and having an output providing decoded video signals, a control and reset flip-flop receiving signals from a pulse generator, a first NOR gate receiving signals from said first NAND gate and from said control and reset flip-flop, a binary count down chain having at least 12 flip-flop stages, each reset by said control and reset flip-flop, the first flip-flop in said count down chain receiving an input from said first NOR gate, a flip-flop operating as a SIGN flip-flop, a second NOR gate having inputs from the last four flip-flops in the said count down chain and from said SIGN flip-flop, a digital-to-analog converter having inputs from the middle six flip-flops of said count down chain and from said second NOR gate, a squitter count indicating meter fed by said digital-to-analog converter, a second and a third NAND gate each having inputs from the sixth, seventh and eighth flip-flops in said count down chain, a fourth NAND gate having inputs from said second and third NAND gates and from said second NOR gate and from said pulse generator for providing an alarm inhibit pulse, a time delay circuit having an input from said fourth NAND gate, and an alarm circuit fed by said time delay circuit for indicating an absence of said alarm inhibit pulse.

No references cited.

NEIL C. READ, *Primary Examiner.*

D. K. MYER, *Assistant Examiner.*